United States Patent [19]

Bosen et al.

[11] Patent Number: 5,060,263
[45] Date of Patent: Oct. 22, 1991

[54] COMPUTER ACCESS CONTROL SYSTEM AND METHOD

[75] Inventors: Robert J. Bosen, Pittsburg; John R. Muir, Antioch, both of Calif.

[73] Assignee: Enigma Logic, Inc., Concord, Calif.

[21] Appl. No.: 165,868

[22] Filed: Mar. 9, 1988

[51] Int. Cl.$^5$ .............................................. H04L 9/00
[52] U.S. Cl. ...................................... 380/25; 380/23; 340/825.31
[58] Field of Search ............... 364/918.7, 943.7, 949.7, 364/922.5, 222.5, 260.6, 225.2; 340/825.31, 825.34, 825.56, 825.3; 235/382, 382.5, 380; 380/23, 24, 25

[56] References Cited

U.S. PATENT DOCUMENTS

| | | | |
|---|---|---|---|
| 4,310,720 | 1/1982 | Check | 340/825.31 |
| 4,396,914 | 8/1983 | Aston | 340/825.31 |
| 4,697,072 | 9/1987 | Kawana | 235/380 |
| 4,847,614 | 7/1989 | Keller | 340/825.31 |

FOREIGN PATENT DOCUMENTS

| | | | |
|---|---|---|---|
| 8503785 | 8/1985 | PCT Int'l Appl. | 340/825.31 |
| 0225010 | 6/1987 | United Kingdom | 380/23 |

*Primary Examiner*—Thomas H. Tarcza
*Assistant Examiner*—David Cain
*Attorney, Agent, or Firm*—Flehr, Hohbach, Test, Albritton & Herbert

[57] ABSTRACT

An access control system is disclosed in which protected systems and corresponding portable password issuing devices both generate new authentic passwords by successively encrypting a stored password with a selected sequence of predefined encryption steps. The protected system generates and displays one or more random digits, selects an encryption sequence by appending the random digits to the user's personal identification number, and generates an authentic password by sequentially encrypting the user's previous password with encryption steps corresponding to each of the digits in the selected encryption sequence. The user generates a purported password by entering his PIN and the displayed random number(s) on the keyboard of his password issuing device, which responds to encrypting a stored previous password value with encryption steps corresponding to the user's keystrokes, and displaying a new password on its display. The user submits his purported new password to the protected system, and the protected system enables access to the protected system when the purported password matches the internally generated authentic password. Each password issuing device can store and generate passwords for a multiplicity of distinct protected host systems.

25 Claims, 8 Drawing Sheets

FIGURE 1

| | PASSWORD | PIN | LIMITATIONS ON AUTHORIZED ACCESS | DES KEYS 0-9 |
|---|---|---|---|---|
| USER 0 | PASSWORD 0 | PIN 0 | SPECIFIED LIMITS: 0 | DES KEYS FOR 0 |
| USER 1 | PASSWORD 1 | PIN 1 | SPECIFIED LIMITS: 1 | DES KEYS FOR 1 |
| USER 2 | PASSWORD 2 | PIN 2 | SPECIFIED LIMITS: 2 | DES KEYS FOR 2 |
| USER 3 | PASSWORD 3 | PIN 3 | SPECIFIED LIMITS: 3 | DES KEYS FOR 3 |
| USER N | PASSWORD N | PIN N | SPECIFIED LIMITS: N | DES KEYS FOR N |

COMPUTER ACCESS CONTROL SYSTEM AND METHOD

The present invention relates generally to computer systems, and particularly to methods and systems for controlling access to data and programs contained in computer systems through the use of dynamically generated passwords.

BACKGROUND OF THE INVENTION Many types of electronic access control systems are used for controlling access to a variety of places and things. The present invention is primarily concerned with controlling access to computer systems, but like other electronic access control systems could also be used for controlling access to buildings and other locations.

Electronic access control systems generally restrict access on the basis of (1) possession of a device or object (e.g., a key) which enables access, (2) knowledge of a password, and/or (3) testing a physical attribute of the person requesting access (e.g., the person's fingerprint).

The inherent limitations of access control systems based solely on possession of a physical object (e.g., a key), including insufficient security when large numbers of users are involved, have prompted the development of more secure access control systems.

Systems that allow access based solely on knowledge of a password are the easiest to set up, but are the least secure because passwords can be inadvertently imparted to unauthorized persons. For example, if an authorized person writes down his password, any unauthorized person who obtains access to the written record of the password can pose a permanent threat to the security of the system. Even if the password is changed from time to time, distribution of new passwords requires additional security precautions, all of which are cumbersome and expensive.

Access control systems based on testing of a physical attribute of the user are currently too expensive for use in most commercial applications.

A large number of prior art systems restrict access by using a combination of the first two techniques described above, i.e., by requiring possession of a device and knowledge of a password. For example automatic teller machines (ATMs) restrict access to a person's bank accounts by requiring possession of a card with an encoded magnetic strip, and knowledge of a personal identification number (PIN).

Another example of a security system which restricts assess by requiring a combination of possession of a device and knowledge of a password is a system, called the SAFEWORD System, made and marketed by Enigma Logic, Inc., the assignee of the present invention. The SAFEWORD System provides a much higher level of security than ATMs by requiring the user to know a password (to identify the user) and to possess an electronic key that specifies an encryption algorithm. Possession of the electronic key, in combination with a decoder, enables the user to dynamically generate a password in response to a challenge presented by the computer that the user wants to access.

The computer allows access to its resources only if the dynamically generated password matches an internally generated password. A more complete description of the SAFEWORD system can be found in patent application Ser. No. 370,902, filed Apr. 22, 1982, which is hereby incorporated by reference.

DYNAMIC PASSWORD SYSTEMS

The SAFEWORD system mentioned above is an example of a class of access control systems which employ dynamic passwords. Generally, access control systems which employ dynamic passwords can be classified into three groups according to the means by which they derive their dynamic passwords: (1) "asynchronous" systems derive passwords by generating and/or encrypting randomly generated numbers, (2) "synchronous" systems derive passwords using algorithms based on the passage of time, and (3) "semisynchronous" systems derive passwords by encrypting prior usage history.

Asynchronous password systems, such as the SAFEWORD system mentioned above, generally require the user to generate a password in response to a "challenge" value generated by the security system. Asynchronous password systems are more secure than either of the other two types of dynamic password systems. Their disadvantage is that they require the user to exert or enter more keystrokes (i.e., by entering the random number challenge) than synchronous and semisynchronous systems. This usually amounts to 7 or 8 more keystrokes than the other systems.

The term "conventional PIN logic" is used herein to refer to access control systems that require the user to enter a memorized personal identification number as part of the system's access request protocol. The purpose of conventional PIN logic is to add a layer of security to the access control system. However, using conventional PIN logic increases the number of keystrokes expended. For example, two prior art access control systems (the PFX Passport made by Sytek, and the Confidant device made by Atalla Corporation) that use PIN logic require the user to enter a keystroke to mark the beginning of the PIN sequence, then the user's PIN, and then another keystroke to mark the end of the PIN sequence.

While the prior art asynchronous password systems have not generally employed conventional PIN logic, one aspect of the present invention is the incorporation of PIN logic into an asynchronous password system by requiring the user to append his PIN to the challenge supplied by the system when generating the dynamic password. As will be described below, the present invention incorporates PIN logic without requrring additional keystrokes to mark the beginning and end of the PIN sequence, thereby reducing the keystroke burden of using PIN logic.

Time synchronous access control systems are generally less secure than asynchronous ones because the security provided is usually based solely on possession of a time synchronous password generator. The premise of these systems is that the "keys" which enable access are very difficult to counterfeit. However, they are also difficult to administer due to the difficulty of maintaining a large population of such devices in exact time-lock step. On the other hand, they are extremely easy to use, requiring no keystrokes at all on the part of the user (other than entering the password generated by the device into the computer). That is, most synchronous password generators are used by entering a password generated by the password generator into a computer which verifies the password transmitted by the generator.

The time synchronous devices currently in use lack keyboards, so they can't implement PIN logic. This is a serious limitation because illicit access requires only possession of the password generator.

Semisynchronous security systems, in their primary mode of operation, require only a single keystroke because semisynchronous password generators typically encode the prior usage history of the device using a predefined cryptographic algorithm and key. For example, assume that F(A,K,P) represents the cryptographic function performed by a semisynchronous password generator, where A specifies the cryptographic algorithm, K specifies the cryptographic key to be used with the algorithm, and P represents the previous password value (i.e., the prior usage history of the device). If "1234" is the previous dynamic password generated by the device, the next password will generated by computing the value of F(A,K,1234).

For all practical purposes this makes semisynchronous password generators as easy to use as time synchronous devices. However, semisynchronous devices must execute a full asynchronous challenge/response sequence approximately 10% of the time—when the dynamic password generator and the computer system become desynchronized—effectively increasing the average basic keystroke burden to (a still very attractive) total of 2. Conventional PIN logic and entry of the resulting dynamic password increases this total to about 14 or 15 keystrokes.

Semisynchronous devices are less secure than asynchronous devices because they can be compromised if they fall into the hands of an attacker, even momentarily. Momentary possession allows an attacker to obtain the next valid password by simply pressing a single button, causing execution of the cryptographic function F(A,K,P) as explained above. Since only P, the previous password value, changes each time that the semisynchronous device is used, an attacker can easily obtain the next dynamic password before it is needed if he can get momentary possession of the device. Thus, it would appear that semisynchronous devices are more secure than time synchronous devices if they are continuously in the possession of the authorized user, but they are less secure if they ever pass (even temporarily) into the hands of an attacker.

Shortcomings of the Prior Art. In general, the prior art devices have either compromised convenience to provide security by requiring too many keystrokes, or have compromised security by eliminating or requiring only a very small number of keystrokes.

A general shortcoming of the prior art systems which dynamically generate passwords is that they generally use only a single encryption or password generation algorithm. While many encryption methods, such as DES, are quite secure, the use of a single encryption method makes it conceivable that a persistent attack on the encryption algorithm will eventually be successful.

An additional shortcoming of the semisynchronous systems in the prior art is that it is difficult to use a single password issuing device for enabling access to more than one computer system. The problem is that the semisynchronous password issuing devices in the prior art maintain and successively encrypt a single prior usage history. Therefore if a single password device is used first with one computer and then with a second computer, the prior usage history in the password device will no longer be in synchronization with the prior usage history of the first computer. Thus, each time the password device is used to obtain access to a different property or computer, the password device would have to be resynchronized with that system—which almost entirely defeats the benefits of using a semisynchronous access security system.

SUMMARY OF THE INVENTION

The present invention is based on a new dynamic password concept which combines the advantages of asynchronous and semisynchronous systems, described above. It reduces the number of keystrokes required of its users, and yet provides a much higher level of security than previous dynamic password systems. Furthermore, it provides a single dynamic password issuing device which can be conveniently used with a multiplicity of access protected systems.

Generally, the present invention is an improvement for an access control system which controls access to at least one protected system, such as a computer. Each protected system includes a keyboard or other input mechanism for reading a purported password submitted as part of a request for access to at least a specified portion of the protected system, and a display or similar mechanism for conveying information to someone requesting access to at least a portion of the protected system. As in previous systems, the protected system stores or calculates at least one authentic password, typically one for each authorized user.

The primary aspects of the improvements in the present invention are (1) the generation of each new authentic password by sequentially encrypting a previous authentic password with a plurality of distinct encryption steps, each of which uses a distint encryption algorithm or cipher, (2) enabling a single password issuing device to store and generate semisynchronous passwords for a multiplicity of distinct protected host systems, and (3) the incorporation of PIN logic into the means for generating new authentic passwords. The level of security provided by the present invention is substantially increased by using multiple distinct encryption steps, because each added encryption step uses a distinct encryption cipher, which makes illicit password generation vastly more difficult. Like existing semisynchronous systems, synchronization is maintained by basing new passwords on "prior usage history", i.e., the previously generated password. Furthermore, incorporating PIN logic improves security by making the generation of authentic passwords dependent not only possession of a password issuing device, but also on possession of confidential information which is easily customized for each user of the system.

In summary, the present invention is an access control system in which protected systems and corresponding portable password issuing devices both generate new authentic passwords using a multiplicity of distinct predefined encryptio steps. In particular, new authentic passwords are generated by successively encrypting a stored password with a selected sequence of predefined encryption steps, each using a distinct encryption cipher. In other words, when the sequence contains more than one encryption step, the result of each encryption step is used as the starting point for the next encryption step.

In the preferred embodiment, ten distinct predefined DES encryption steps are available for use, and a sequence of encryption steps is selected by randomly selecting at least one decimal digit and appending the randomly selected digit(s) to the user's personal identification number. Only the randomly selected digits are displayed on the protected system's display. Then, a new password is generated by the protected system by sequentially encrypting the stored password for that user using the encryption steps corresponding to the selected sequence.

Authentic password issuing devices contain a digital computer capable of performing the same predefined DES encryption steps as used in the protected system, and a keyboard for initiating the execution of corresponding ones of these encryption steps.

The user, if authorized and in possession of an authentic password issuing device, generates an authentic password by entering his PIN and the displayed random number(s) on the keyboard of his password issuing device 26, which responds to each keystroke by displaying a new password on its display.

The user submits or enters his purported new password to the protected system, which compares the purported password submitted by the user with the new authentic password that it has internally generated. Access to the protected system (or portion thereof corresponding to the user's identity) is allowed when the purported password matches the internally generated authentic password.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Figure 1:
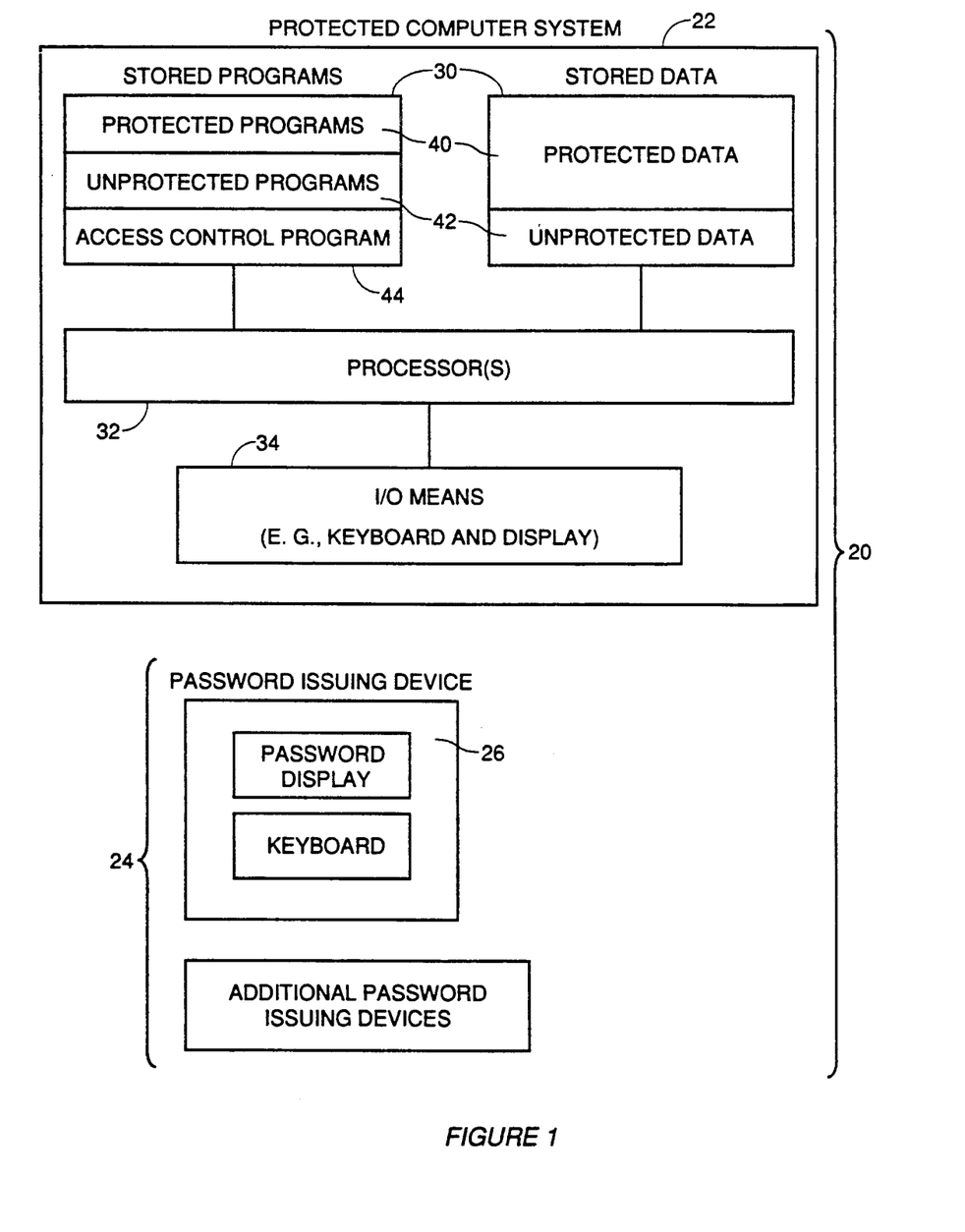
FIG. 1 is a block diagram of an access control system in accordance with the present invention.

Referring to FIG. 1, there is shown a generalized block diagram of an access control system 20 in accordance with the present invention. The basic components of the system 20 are a protected computer system 22 and a set 24 of password issuing devices 26.

For the purposes of this description, the term "protected computer system" shall mean a digital computer system in which at least a portion of the stored information (e.g., data, programs, or both) are protected from unauthorized access. However, it should also be understood that the present invention is applicable to systems for protecting other types of systems (e.g., systems for limiting access to a room or other physical area), in which case the protected system 22 will include a digital computer system for controlling access into the protected system.

There are no particular restraints on the nature of the "computer system" being protected, and thus the "computer system" may be a personal computer, a data processing installation, a telecomputing system, or even a distributed system having a multiplicity of computers interconnected in various ways.

In general, the computer system 22 will include memory or storage means 30 for storing data and programs, as well as one or more processors 32 (i.e., central processing units or other processing means), and input/output ports 34 for communicating with the users of the system 22. The , input/output ports 34 will typically be a keyboard and display on small computer systems. In larger system, the input/output ports 34 may include a multiplicity of computer terminals (including terminals which are connected to the system via telephone connections).

For the purposes of this description, it is assumed that the computer's storage means 30 is being used to store protected data and/or computer programs 40 and may also stored unprotected data and computer programs 42.

As indicated in Figure every protected system incorporating the present invention must contain an access control program 44 for limiting access to the protected data and/or computer programs 40 in the protected system 22.

As mentioned above, access control systems in accordance with the present invention also contain a set 24 of password issuing devices 26. As will be described in more detail below, each password issuing device 26 contains its own digital processor and password generating software which enables its user to dynamically generate passwords needed to gain access to at least a portion of the protected data and/or programs 40 in the protected system 22.

Access Control Data

Figure 2:
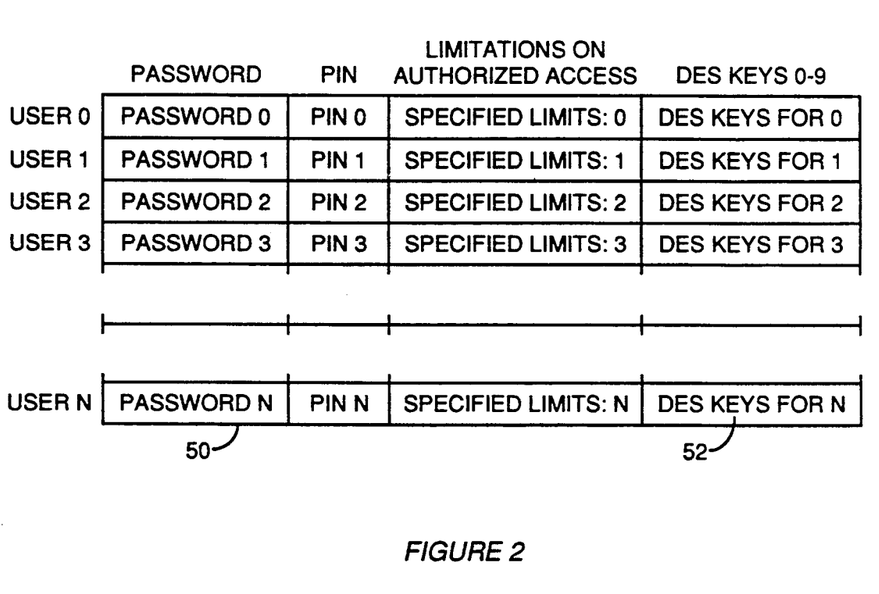
FIG. 2 is a block diagram of the access control data stored in a protected system.

As in most computer security systems, the access control software in the present invention uses certain access control data, including user identifier and passwords. FIG. 2 is a block diagram of the access control data stored in the preferred embodiment. As is standard, this data is stored in encrypted form to make reverse engineering of the access control data extremely difficult.

An array 50 of access control data is used to store the access control data associated with each authorized user, or each unique user identification. For the purposes of this discussion, it is assumed that each authorized user is authorized to access at least a portion of the protected data 40 stored in the protected computer system 22. This array 50 is embeded in the access control software 44. In the preferred embodiment, for each authorized user there is stored the last value of a dynamic password, a personal identification number (PIN), and an indication of the limitations, if any, placed on the user's access to the protected portions of the system 22. These limits may be specified in terms of the number of times, and/or the length of time that the user may access the system 22 before having to request a renewal of the authorization to access the system.

In the present invention, the access control data for each authorized user also includes a set 52 of ten ciphers or keys, herein labelled DES KEY 0 through DES KEY 9, which are used to encrypt passwords. As will be described in more detail below, new passwords are generated from previous passwords by sequentially encrypting the previous password with a sequence of encryption steps. Each encryption step uses one of the ten ciphers, and uses the result of the previous encryption step as the data to be encrypted.

As noted, in the preferred embodiment every user has a personal identification number (PIN). Typically, each PIN is a sequence of two or more digits known only to the user and the access control program. While the use of PINs is not essential to the present invention, the use of PINs can greatly increase the level of security provided— particularly because the present invention provides an unusually secure method for communication of the PIN by the user to the access control program, as will be explained in more detail below.

Access Control Method.

Figure 3:
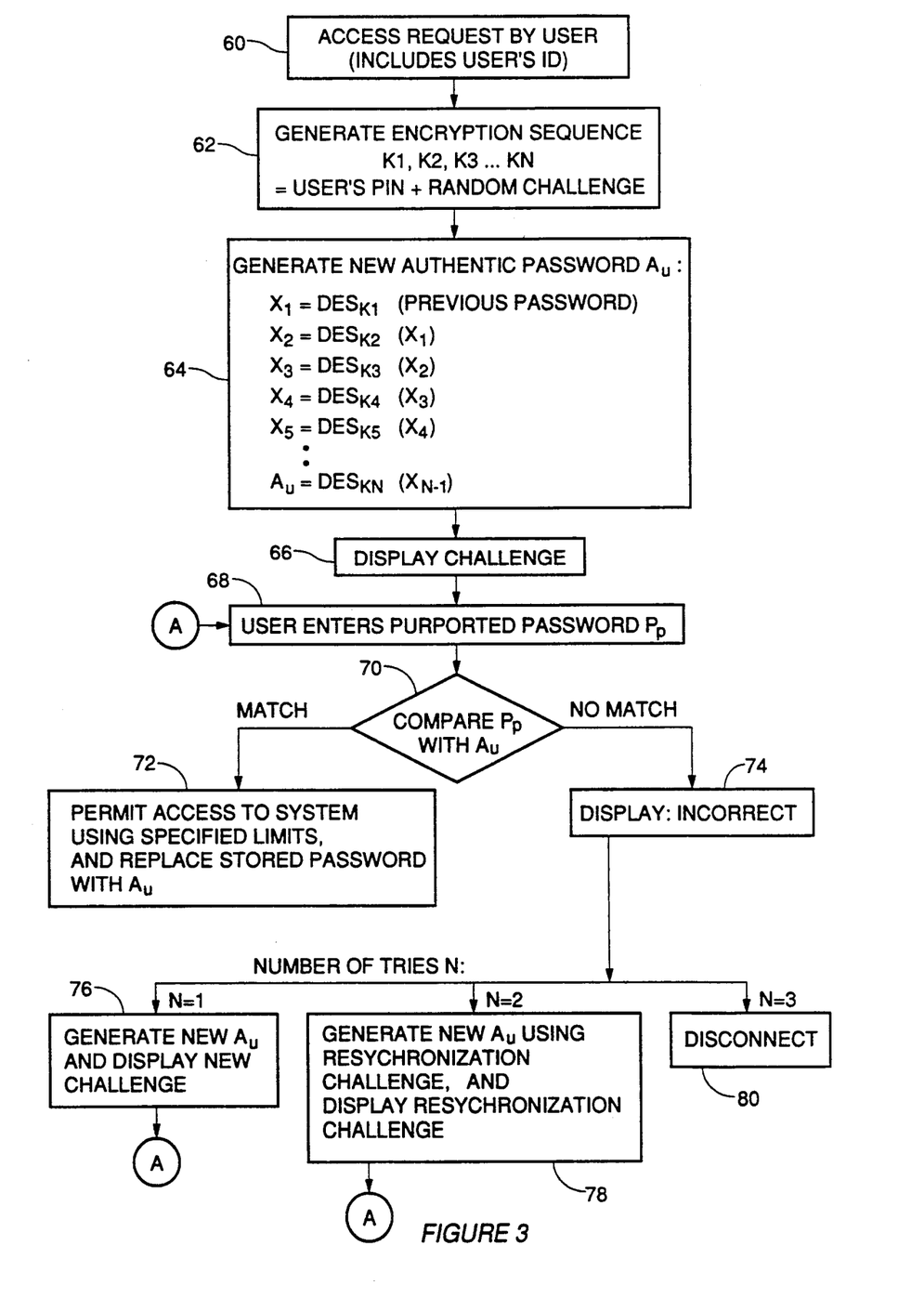
FIG. 3 is a flow chart of the password confirmation process used in the preferred embodiment.

FIG. 3 is a flow chart of the password confirmation process used in the preferred embodiment. The process begins when a user requests access to the system (box 60). As part of the request, the user generally must specify his purported user identification so that the system can test whether the person requesting access is in fact the specified user.

In response to the request, the access control software generates or selects an encryption sequence K1, K2, K3, ... KN which will be used to generate a new authentic password for the specified user (box 62). In the preferred embodiment, the encryption sequence is represented as a series of "digits", where each "digit" corresponds to an encryption step using a corresponding cipher value. In the preferred embodiment, each encryption step uses an encryption algorigthm called the Data Encryption Standard (DES), and thus the ciphers used are herein called DES ciphers. Furthermore, the encryption sequence is selected by appending a randomly generated "challenge" value, corresponding to one or more encryption steps, to a sequence of encryption steps determined by the user's PIN.

Next (box 64) the access control software generates a new authentic password Au by performing the selected sequence of encryption steps:

$$X_1 = DES_{K1} \text{ (PREVIOUS PASSWORD)}$$
$$X_2 = DES_{K2} (X_1)$$
$$X_3 = DES_{K3} (X_2)$$
$$X_4 = DES_{K4} (X_3)$$
$$X_5 = DES_{K5} (X_4)$$
$$\vdots$$
$$A_u = DES_{KN} (X_{N-1})$$

where $DES_{K1}$ through $DES_{KN}$ represent a sequence of N unpredictable (i.e., unpredictably or randomly selected) encryption steps or algorithms, and the value of the subscripts K1 through KN determines the cipher to be used in the corresponding step. Each successive step encrypts the previous dynamic password value until the new authentic password value $A_u$ is generated.

The value of the random challenge is displayed (box 66) so that the user, if authorized and in possession of a password issuing device 26, can generate the same password as the one generated by the access control software 44. The process by which the password issuing device generates new passwords is described in more detail below.

In any case, from the view point of the access control software, the user enters a purported password $P_p$ (box 68), which is compared with the authentic password $A_u$ (box 70). If the two match, the user is permitted access to the system in accordance with the specified limitations in array 50 (FIG. 2) and the stored password for that user is replaced with the new dynamic password value Au (box 72).

It should be noted that in the preferred embodiment, the password issuing device 26 displays only a portion (e.g., six decimal digits) of the password which it has generated. Therefore, when the access control software compares the purported password $P_p$ with the authentic password $A_u$ only a portion of the authentic password is compared with the purported password. If $A_u$ and $P_p$ do not match, then the access control software displays an error message (box 74). The access control software, however, takes into account that the user may have accidentally made a data entry error. Therefore, the next step depends on how many incorrect purported passwords the user has entered. After the first mistake, the access control program gives the user another chance by generating a new authentic password $A_u$, using a new challenge value (box 78).

Another problem taken into account by the access control program is that the user's password issuing device may have become desynchronized with the access control program. This can happen, for instance, by randomly pushing the buttons on the password issuing device. Thus, after the user enters an incorrect purported password, the access control program attempts to resynchronize with the user's password issuing device (box 78). This is done by using a predefined resynchronization password (e.g., a value of zero, or any other predefined value) as the "previous" password, and encrypting it with a new challenge value. This new challenge value is called a resynchronization challenge because, when it is displayed, the display includes the letter "C" to indicate that the user should use the CLEAR button on his password issuing device—as will be described in more detail below. The process then continues with the entry by the user of a new purported password (box 68).

Finally, if the user fails to enter a correct password in response to the resynchronization challenge, the access control program "disconnects"—to prevent him from further attempts to gain access to the system (box 80) because, insofar as the access control program can determine, the user is not an authorized user of the protected system 22.

It should be noted that the "old" password value for the user is not replaced with the new password value $A_u$ unless or until the user enters a purported password that matches the newly generated authentic password. Thus, an interloper cannot cause the access control program to become desynchronized with the legitimate, authorized user.

Password Issuing Device

Figure 4:
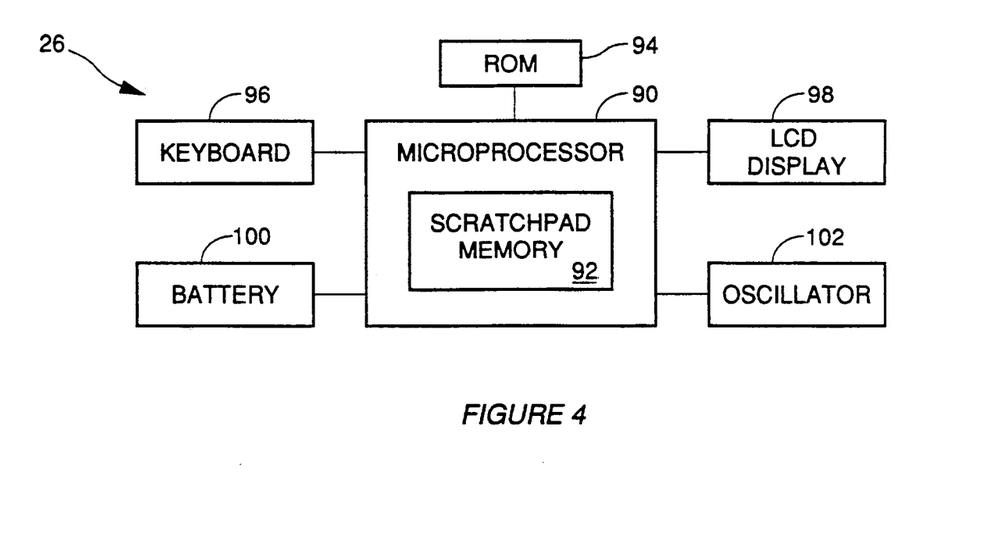
FIG. 4 is a block diagram of the circuitry in a password issuing device.

Referring to FIG. 4, the password issuing device 26 is similar in size and basic circuitry to conventional credit card-sized calculators. The basic components of the device 26 are a microprocessor 90 (such as the model TMP47C820F 4-bit CMOS microprocessor made by Toshiba) having an internal scratchpad memory 92, a read only memory (ROM) 94 for storing computer software used by the microprocessor to generate new passwords, a keyboard 96 for entering data and commands, and an LCD display 98. A battery 100 provides the power required for operation of the device 26, and an oscillator, digital clock or timer 102 keeps track of the passage of time (e.g. for measuring the delay times between keystrokes).

Figure 5:
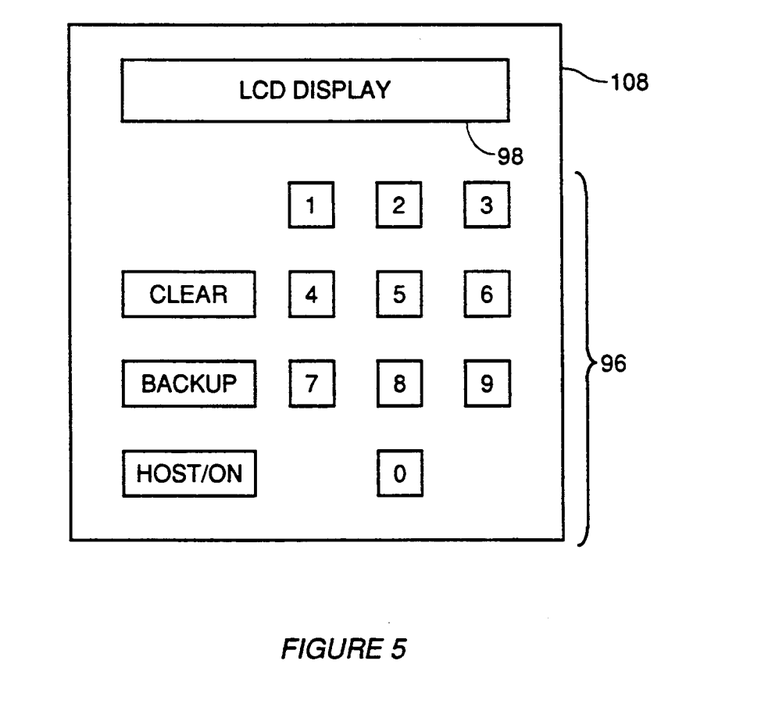
FIG. 5 depicts a preferred embodiment of the front panel of a password issuing device.

As shown in FIG. 5 the front panel 108 of the password issuing device 26 contains a display 98, a keyboard 96 having ten numeric keys labeled 0-9, and three function keys labeled HOST, CLEAR and BACKUP. The function and operation of these buttons are described below in the section entitled Operation of Password Issuing Device.

Figure 6:
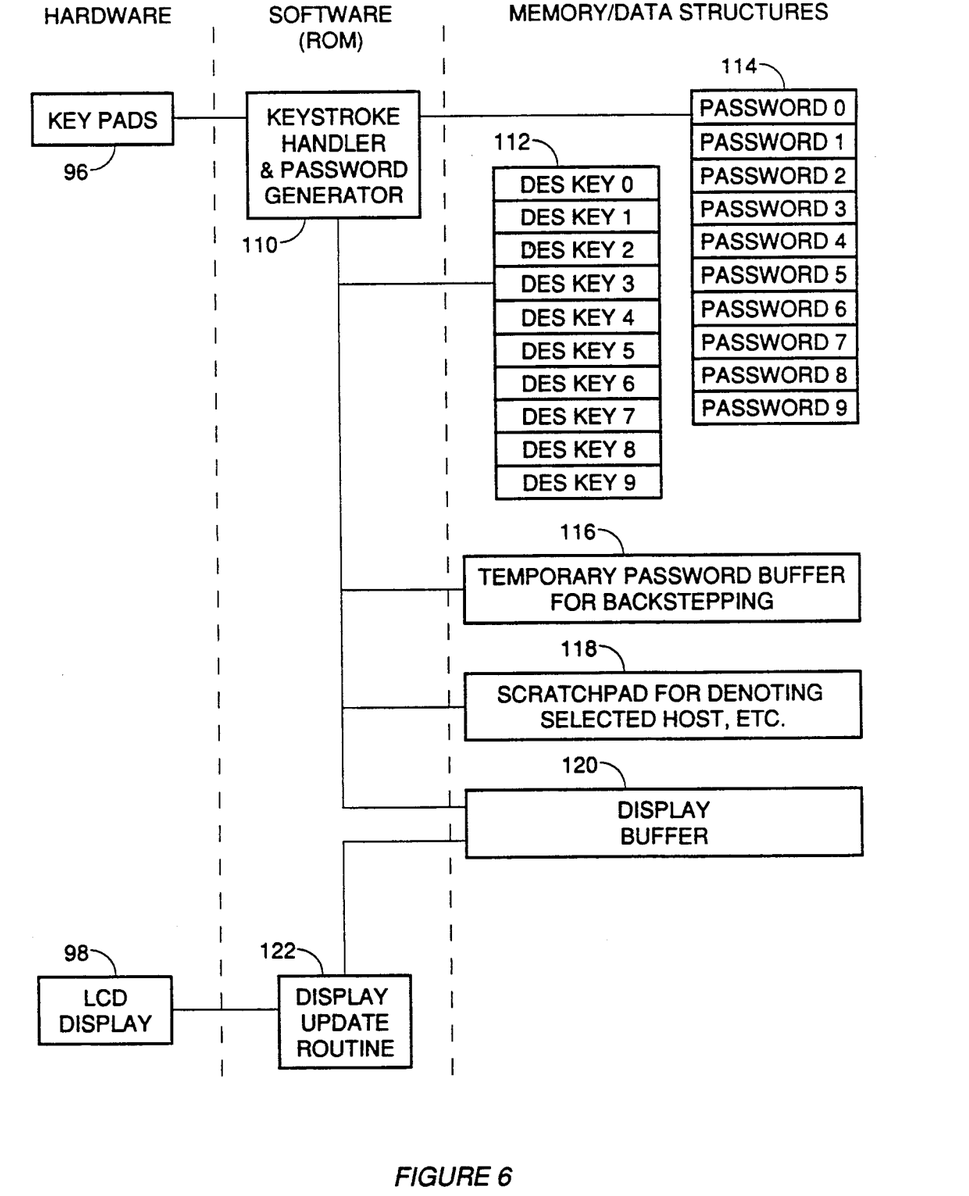
FIG. 6 is a conceptual block diagram of a password issuing device.

FIG. 6 is a conceptual diagram showing the interrelationships of the hardware and software components of the password issuing device 26. In particular, the software in the password issuing device includes a keystroke handler and password generating routine 110 which responds to keystroke signals from the keyboard 96. This routine uses an array of ten DES cipher keys 112 stored in the ROM 94, as described above.

Several arrays 114-120 are stored in the device's scratchpad memory 92 (see FIG. 4). This includes an array 114 in which ten dynamic passwords are stored—so that the device 26 can store and generate dynamic passwords for ten distinct "hosts" (i.e., protected systems, or portions of protected systems). Each host is given a distinct "host number" between 0 and 9.

During the generation of new passwords, all of the intermediate dynamic passwords are stored in a temporary buffer 116, so that the user can backstep if an incorrect key is accidentally pressed. Another portion 118 of the scratchpad memory is used to denote the currently selected host (i.e., the corresponding host number), and also the current values of several software timers used by the keystroke handling portion of routine 110.

Finally, a display buffer 120 is used to store the pattern to be displayed on the LCD display 98. A display routine 122 periodically scans the contents of the display buffer 120 to update the pattern shown on the display 98.

Operation of Password Issuing Device

Figure 7:
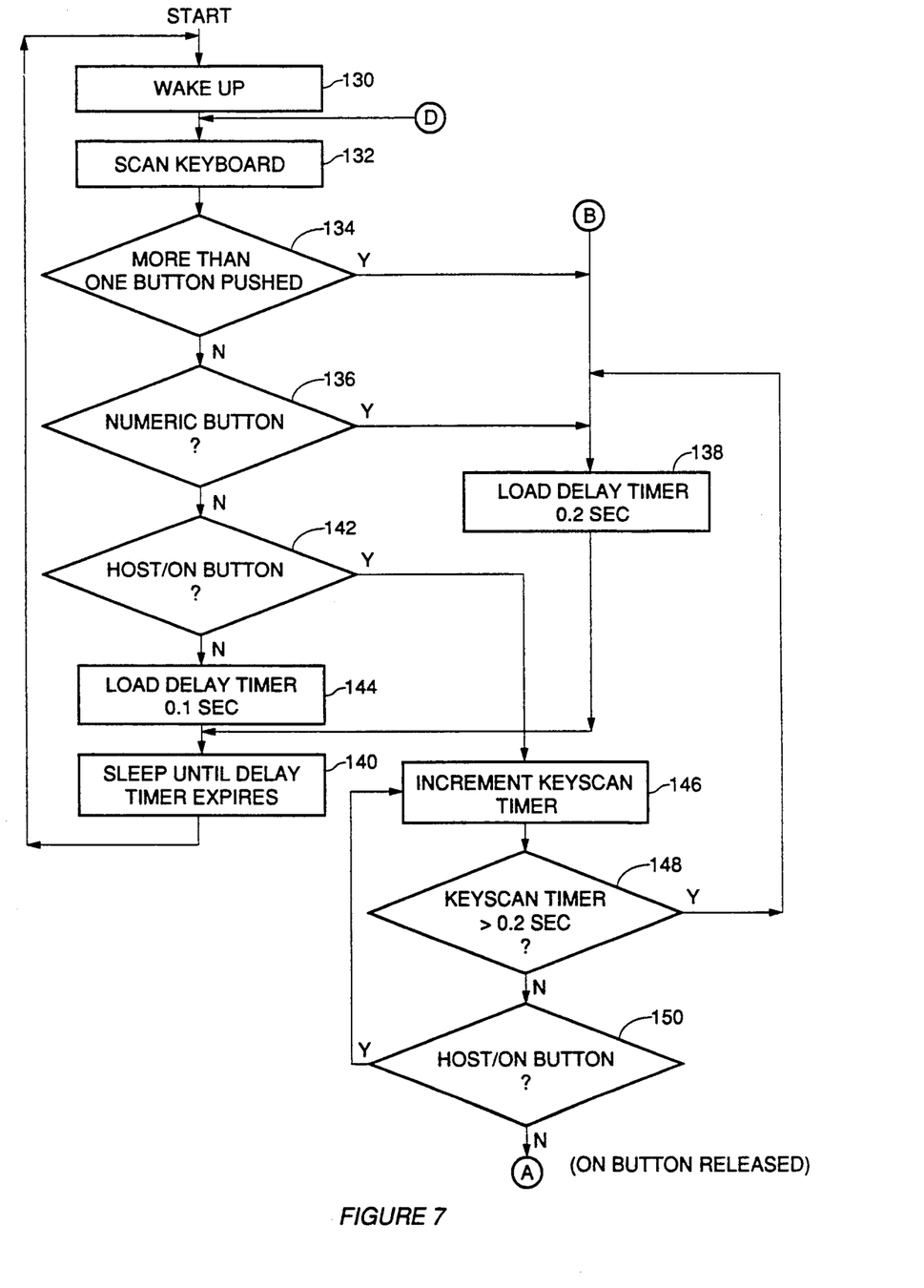
FIGS. 7, 8 and 9 are detailed flow charts showing the operation of the password issuing device in the preferred embodiment.
Figure 8:
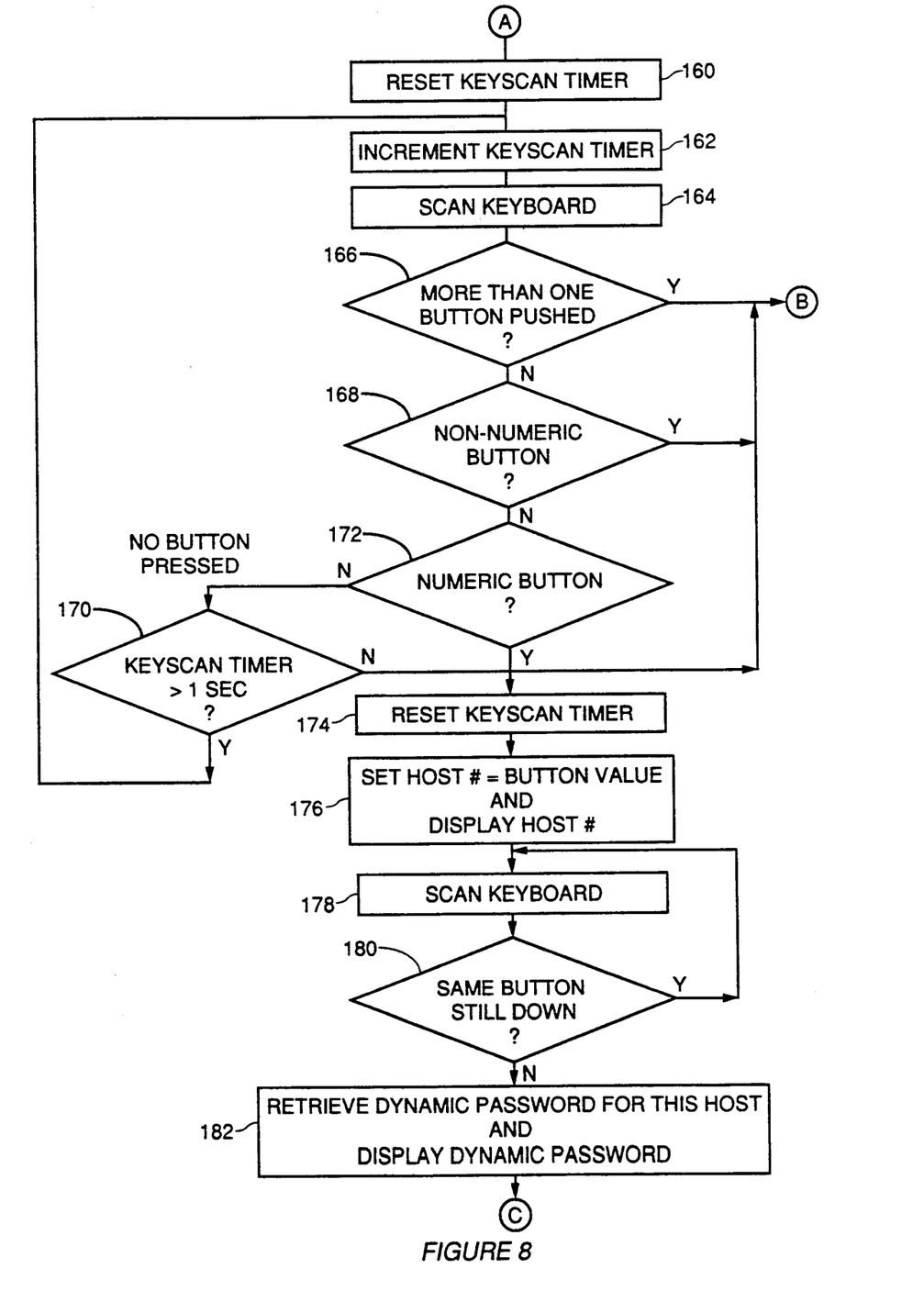
Figure 9:
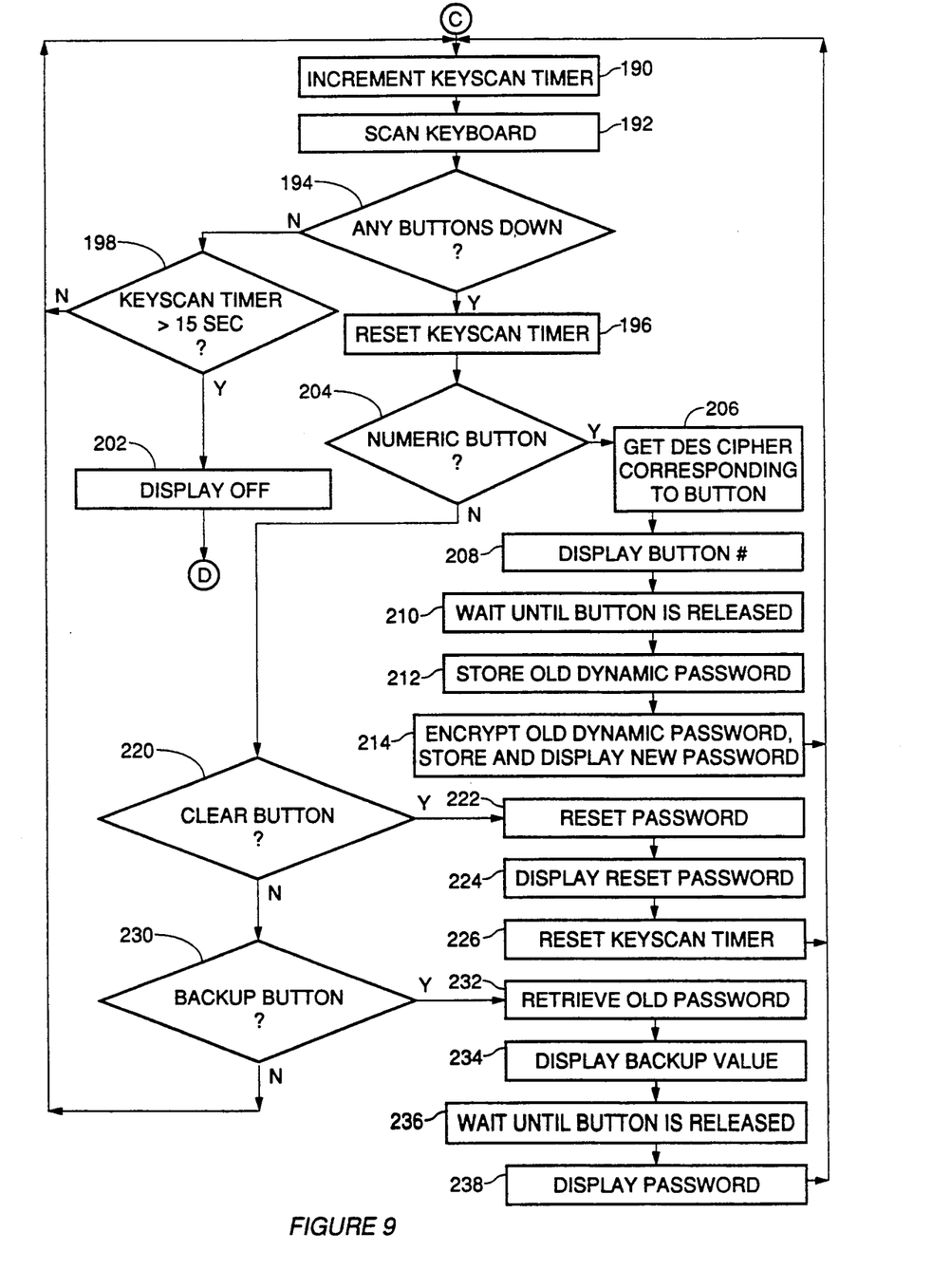

In the preferred embodiment, ten cipher keys, each corresponding with the keyboard buttons labelled 0 through 9, are used with the standard DES crypto-algorithm to encrypt prior usage history. In other words, the cipher keys are used to generate a new dynamic password by encrypting the previous value of the dynamic password. FIGS. 7, 8 and 9 are detailed flow charts showing the operation of the password issuing device in the preferred embodiment.

To encrypt the previous dynamic password value with cipher "3", the user simply presses the "3" button on the password issuing device 26, whereupon the device encrypts and displays the result of it's previous value with encryption algorithm number 3. Furthermore, every time a button or key on the keyboard 96 is pressed, the previous password value is encrypted using the corresponding cipher.

Generally, the access control process can be viewed as a "challenge and response" process. The access control program issues a challenge to the user, and the user responds by using the challenge to generate a new password. In the preferred embodiment, multiple-digit challenges are handled by the user by repeatedly pressing the corresponding buttons on the keyboard 96, thereby causing the previous password value to be sequentially encrypted by the corresponding ciphers—i.e., by repeating the encryption process multiple times Thus, in response to the two-digit challenge "34", the user would press the "3" button as before, followed by the "4" button, observing the final result as the new dynamic password. In the preferred embodiments, the access control system generates either a two or three digit challenge each time a user requests access to the protected system.

As shown in FIG. 5, several special keyboard buttons are provided in order to improve user convenience in operation of the device 26. Each is described in the following paragraphs.

Dual-mode numeric buttons. Each of the ten numeric buttons operates in two different modes. As each button is depressed, the first mode is activated, resulting in display of the corresponding value. Thus, as long as the user holds down the "3" button, a "3" is displayed. As each button is released, the second mode is activated, resulting in encryption of the previous dynamic password value and display of the new dynamic password value as described above.

"Clear" button. The "clear" button on the device's keyboard resets the value of the usage history to a predefined value, such as zero. This provides a known "starting point" so the device can be initially synchronized with data security software. The clear button can also be used to re-synchronize the device in the event of some type of error, failure, or de-synchronizing event such as usage of the device with some other system. If the clear button is depressed at the beginning of every sequence, then the device is. effectively an asynchronous device.

"Backuo" button. The "backup" button reverses the effect of the previous numeric keystroke in order to help the operator correct keystroke errors. Thus, if after entering the sequence "1235" the operator determines that the sequence should have been "1234", the backup button can be pressed. The first actuation of the backup button will result in display of "5". Upon release of the backup button, the display will indicate the number held prior to entry of the "5" button. At this point, the operator can continue forward through the sequence, making corrections as needed.

In the preferred embodiment, up to ten previous password values are stored in the ,backsteooino buffer 116 (FIG. 6) so that the user can backstep up to ten times. Also stored in the backstepping buffer are the numeric values of the buttons pressed during the encryption process. However, the backstepping buffer 116 is cleared every time the device is activated (i.e., at box 130 in FIG. 7), and therefore the user cannot backstep to undo previously completed password generation sequences.

"Host" button. The "Host" button is used to command the password issuing device to activate its prior usage history with one of up to ten remote systems. Thus, prior usage histories can be maintained independently for up to ten different remote or host systems in order to make it possible to use the password issuing device with several different systems without losing synchronization. To designate the host being accessed, the user pushes the Host button, followed by one of the ten numeric buttons on the keypad.

For example, if the user wants to use his password issuing device to access a computer system which has been assigned to him as host system number 5, he or she would begin by pressing down the Host button. In response, the display would indicate "H". The operator would next press the "5" button. While the 5 button is held down, the display will indicate "5". Upon release of the 5 button, the display will indicate the value of prior usage history with host number 5, indicating that the device is prepared to receive any challenge generated by security software on host 5.

In an anticipated enhancement to the preferred embodiment, security software on host 5 can display the previous password as a convenience to the user, who will visually verify that the number displayed by the password issuing device matches the prior usage history of the selected host computer before proceeding.

PIN Logic. The present invention implements PIN logic in a simple and natural way, by recognizing that the user can memorize and manually enter any fixed modification to transmitted challenges. Thus, if a user chooses a PIN of "1234" and is given the random challenge "23", he or she would enter "123423" into the device 26. The security logic on the remote host would know the user's PIN and would derive its matching dynamic password by encrypting the user's prior usage history using cipher keys 1, 2, 3, 4, 2, and 3, which would, of course, result in the same answer. Thus there is no need for the operator to expend extra keystrokes to begin or end the PIN sequence.

Secure communication of the PIN. Administration of a large number of PINs has proven to be difficult in dynamic password systems previous to the present invention due to the need to protect the PIN. Usually, this is accomplished by having users enter their own PIN values into their own devices. However, the prior art mechanisms for accomplishing this are cumbersome and error-prone.

Others have attempted to have a centralized security administrator assign PINs, but this methodology has been criticized because it is not considered good security practice for the administrator to be aware of user passwords or PINs. Still others have attempted to have the centralized security software generate the PINs without informing the administrator of the associated PIN value, but this methodology has been criticized due to the necessity to transmit the PIN, sometimes using an unsecured telecommunications network between the security software and the user's terminal. (If the network were secure, there would be no need for dynamic password security logic.)

In the present invention the PIN can be communicated without security compromise using the following sequence of steps. Once a dynamic password interchange has been completed successfully, the security software and the password issuing device are known to be synchronized. The security system therefore knows the current value being displayed by the password issuing device.

At that point, if the user has not previously specified a PIN value that is to be used with his user ID, the security software can ask the user to choose the first digit of the PIN, press the corresponding numeric button on the password issuing device, and communicate the resulting dynamic password to the security software.

The security software then determines which of the ten cipher keys was used to obtain the transmitted result from the known starting value. This is done by encrypting the known starting value with each of the possible cipher keys until a match is found. When a match is found the software "knows" which button the user pressed.

This process continues digit by digit until the user has chosen as many PIN digits as are desired, whereupon he or she enters a special character such as "ESC" on his or her terminal, completing the process.

Detailed Description of Operation of Password Issuing Device -p Referring to FIGS. 7-9, the keyboard handling and password generating software in the password issuing device in the preferred embodiment works as follows. When the device is not being used, it is kept in a dormant state in which its only activity is to periodically wake up (box 130), scan the keyboard (box 132) and determine if the HOST/ON button has been pressed (boxes 134, 136, and 142). It should be noted that the wake up step (box 130) clears the backstepping buffer 116, the display buffer 120, and the counters for two software timers called the delay timer and the keyscan timer.

The password issuing device enters its active state only when the HOST/ON button has been pressed.

If more than one button has been pushed (box 134) or if a numeric button has been pushed (box 136), a software timer (i.e., a software routine which periodically decrements the value in a counter until it reaches a value of zero) herein called the delay timer is set to 0.2 seconds (box 138) and the device "sleeps" until the delay timer expires (box 140), and the periodic keyboard scanning resumes at box 130 Normally, if no keys have recently been pressed (or if the CLEAR or BACKUP button has been pressed), the delay timer is reset to 0.1 second (box 144) so that the device sleeps (box 140) for only 0.1 second between keyboard scans. A longer delay time (0.2 second) is used when two buttons or a numeric button has been pushed to minimize the amount of electrical energy used by inadvertent pressing of the buttons and also to ensure that the device gets a clean start when the HOST/ON button is pressed purposely by the user.

After the device determines that the HOST/ON button has been pressed (box 142), a software timer herein called the keyscan timer is used to ensure that the user is deliberately using the device. In particular, step 146 increments the keyscan timer until the keyscan timer reaches a value of 0.2 second (box 148) or the HOST/ON button is released (box 150). If the keyscan timer reaches a value of 0.2 second before the HOST/ON button is released (box 148), the pressing of the HOST/ON button is ignored and the device goes back to the dormant state starting at box 138.

If the HOST/ON button is released (box 150) before the keyscan timer times out, the keyboard scanning process continues at node A in FIG. 8.

Referring to FIG. 8, the keyscan timer is reset (box 160) and then keyboard is repetitively scanned and the keyscan timer is incremented (boxes 162 and 164) until the next button is pushed. However, if more than one button is pushed simultaneously (box 166) or a non-numeric button is pushed (box 168), the keyscanning process is aborted and the device is put back into its dormant state, starting at box 138 in FIG. 7 (via node B). Similarly, if no button is pushed during a predefined period (i.e., if the keyscan timer reaches a predefined limit, such as 1 second) after the HOST/ON button is released (box 170) the device is put back into a dormant state via node B in FIG. 7.

If a numeric button is pushed after the HOST/ON button is released (box 172), the keyscan timer is reset (box 174), a variable called the HOST # is set to the value of the numeric button which has been pushed, and this HOST # is displayed (176) until the numeric button is released (boxes 178 and 180). When the button is released, the dynamic password (stored in array 114, shown in FIG. 6) for the specified HOST # is retrieved and displayed (box 182).

Referring to FIG. 9, once the HOST # has been selected, the process for generating dynamic passwords is as follows. First, the keyscan timer is periodically incremented (box 190) and the keyboard is scanned (box 192) to determine if any buttons have been pressed (box 194). Each time a key is pressed the keyscan timer is reset (box 196) and the keystroke is processed. However, if a predetermined amount of time (e.g., 15 seconds) passes between keystrokes (box 198) the display is turned off (box 202) and the device is put back into a dormant state via node D to box 132 in FIG. 7.

When a keystroke is detected, it is processed in accordance with the type of key pressed. When a numeric key is pressed (box 204), the password issuing device gets the DES cipher corresponding to the button pushed (box 206) and displays the numeric value of the button pushed (box 208) until the button is released (box 210). Then the old password value (for the selected host) and the button number are stored in the backstepping buffer (box 212), a new password value is generated by encrypting the old password value using the selected DES cipher, and the new password value is displayed (box 214). The new password value is also stored in the password array 114 in the slot for the currently selected hose (box 214).

When the CLEAR button is pressed (box 220), the password for the currently selected HOSE is reset (box 222) to a predefined resynchronization value (e.g., 0), the reset password value is displayed (box 224) and the keyscan timer is reset (box 226).

When the BACKUP button is pressed (box 230), the last password value, if any, in the backstepping buffer 116 is retrieved (box 232). Note that if no values are currently stored in the backstepping buffer, because no new pass-words have been generated or because the CLEAR button was previously used, then this step does not change the current password value. Also, while the BACKUP button is held down, the last numeric button value stored in the back-stepping buffer, if any, is displayed (box 234). This shows the user which keystroke is being deleted or back-stepped over.

When the BACKUP button is released (box 236), the retrieved password value is displayed (box 238). Thus, by successively pressing the BACKUP button the user can reverse the effect of previous encryption steps. Furthermore, each time that the BACKUP button is pressed, the retrieved password value is stored in the slot of the password array 114 for the selected host.

Conclusions

The present invention can be virtually as simple for the user to operate as time-synchronous dynamic password issuing devices. It can derive dynamic passwords with multiple encryption ciphers resulting in much higher security than any other known method. It is easily adaptable to "challenge sequences" of any desired length.

Challenges as short as a single digit can be implemented to maximize convenience, while longer challenges can be used to maximize security. The present invention also solves all of the problems that are known to cause difficulties with administration of PINs in existing devices and environments.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the exact form of the password issuing device, and the particular time constants used in the keyboard handling process are clearly not essential to the invention and may vary from one implementation to another.

In another example of an alternate embodiment, each distinct encryption step could be characterized by a distinct encryption algorithm instead of, or in addition to, a distinct encryption cipher.

In yet another example of an alternate embodiment, the format of the challenge sequence could be modified from the above described preferred embodiment so as to be optimized for the convenience of the user. For example, the present invention could be embodied in a system in which the protected host issues (e.g., displays) multi-digit challenges that incorporate the host selection, challenge and PIN logic aspects of the invention. One such challenge could be displayed as "478PIN".

The user responds by entering the following keystrokes into his password issuing device:

HOST/ON, 4, 7, 8, followed by his PIN and then entering into the host computer the resulting password displayed on the password issuing device.

This exemplary challenge consists of three parts. The first part is a single digit, "4". When entered by the user into his password issuing device, this value commands the device to retrieve the prior usage history held in register 4 (of array 114, in FIG. 6). In effect, the host is telling the user (and his password issuing device) that it knows it is "host number 4", and it is requesting that the corresponding prior usage history be retrieved.

The second part of the challenge, "78", are two digits with random values to ensure that the sequence will be unpredictable. The use of a randomly generated challenge sequence ensures that an unauthorized user, who may happen to get momentary possession of the password issuing device, cannot anticipate the challenge and calculate the next authentic password in advance, even if he or she has observed the authorized user entering that user's PIN.

The last part of the displayed challenge, "PIN", is displayed by the protected host to remind the user to append his PIN to the challenge. This ensures that an unauthorized user who obtains possession of a password issuing device cannot use it to obtain the next authorized password so long as he or she does not know the PIN value for that device, even if he or she knows the remainder of the signon procedure.

What is claimed is:

1. An access control system, comprising:
   at least one protected system, each protected system including means for reading a password submitted by a user as part of a request for access to at least a specified portion of said protected system, means for conveying information to said user, and digital computer means coupled to said reading means and said information conveying means for determining whether to permit access to said protected system; said digital computer means including:
   means for storing at least one authentic password;
   means for selecting any sequence of one or more encryption steps from a multiplicity of distinct predefined encryption steps;

means for generating a new authentic password by encrypting a stored password with the first of said selected sequence of predefined encryption steps and, when said sequence contains more than one encryption step, successively encrypting the result of each previous encryption step with the next of said selected sequence of predefined encryption steps;

means for challenging said user, via said information conveying means, to encrypt a previously defined password value with said selected sequence of encryption steps and to submit a password which is the result of said selected sequence of encryption steps; and means for comparing said new authentic password with said submitted password, and for permitting access to said portion of said protected system when a submitted password matches said new authentic password;

said access control system further including at least one portable passward issuing device for issuing authentic passwords to the possessor thereof, including storage means for separately storing said previously defined password for each of one or more distinct protected systems or portions of protected systems.

2. An access control system as in claim 1, wherein said at least one portable password issuing device includes
   means for selecting a sequence of one or more encryption steps from said multiplicity of distinct predefined encryption steps, and
   means for generating a new authentic password by encrypting a stored password with the first of said selected sequence of one or more predefined encryption steps and, when said sequence contains more than one encryption step, successively encrypting the result of each previous encryption step with the next of said selected sequence of predefined encryption steps.

3. An access control system as in claim 2, wherein said at least one portable password issuing device includes backup buffer means coupled to said generating means of said portable password issuing device for storing the results of at least one encryption step prior to the last encryption step performed by said generating means, backup key means for generating a backup signal, and backup means coupled to said generating means of said portable password issuing device for responding to said backup signal generated by transmitting an entry in said backup buffer means to said generating means for use in the next encryption step by said generating means.

4. An access control system as in claim 1, wherein said at least one portable password issuing device includes means for selecting one of said passwords stored in said device for use by said means for generating a new authentic password; said means for generating including means for replacing said selected password in said storage means with said new authentic password generated by said generating means.

5. An access control system as in claim 4, wherein said means for conveying includes means for prompting said user to select one of said passwords stored in said portable password issuing device.

6. An access control system as in claim 1, wherein said means for storing includes means for storing an authentic password and a personal identification number for a plurality of user identification values, each user identification number and value corresponding to a user of said system;
   said reading means includes means for reading a user identification value; and
   said means for selecting a sequence of one or more encryption steps includes means for generating a challenge value comprising at least one digit, and means for selecting a sequence of encryption steps corresponding to a predefined combination of said challenge value and a stored personal identification number in said storing means corresponding to said user identification value read by said reading means.

7. An access control system as in claim 6, said means for generating a challenge value comprising means for generating a random number having at least one randomly generated digit.

8. An access control system as in claim 1, including means for resynchronization of said digital computer means of a protected system with said at least one portable issuing device, including means in said computer means for resetting said authentic password stored by storing a predefined resynchronization password in said storing means, and means for conveying, via said information conveying means, that said stored password has been reset; and
   means in said at least one portable password issuing device includes resynchronization key means for generating a resynchronization signal, and means coupled to said generating means of sid portable password issuing device for responding to said resynchronization signal by storing said predefined resynchronization password in said storage means of said portable password issuing device.

9. In an access control system comprising at least one protected system having means for reading a password submitted as part of a request for access by a user to at least a specified portion of said protected system, means for conveying information to said user, and digital computer means coupled to said reading means and said information conveying means for determining whether to permit access to said protected system, said digital computer means including means for storing at least one authentic password; the improvement comprising:
   software means in said digital computer means including:
      means for selecting a sequence of one or more encryption steps from a multiplicity of distinct predefined encryption steps,
      means for generating a new authentic password by encrypting a stored password with the first of said selected sequence of predefined encryption steps and, when said sequence contains more than one encryption step, successively encrypting the result of each previous encryption step with the next of said selected sequence of predefined encryption steps,
      means for challenging said user, via said information conveying means, to encrypt a previously defined password value with said selected sequence of encryption steps and to submit a password which is the result of said selected sequence of encryption steps; and
      means for comparing said new authentic password with said submitted password, and for permitting access to said portion of said protected system when a submitted password matches said new authentic password;

and at least one portable password issuing device for issuing authentic passwords to the possessor thereof, including storage means for separately storing said previously defined password for each of one or more distinct protected systems or portions of protected systems.

10. An access control system as in claim 9, wherein said at least one portable password issuing device includes
means for selecting a sequence of one or more encryption steps from said multiplicity of distinct predefined encryption steps, and
means for generating a new authentic password by encrypting a stored password with the first of said selected sequence of predefined encryption steps and, when said sequence contains more than one encryption step, successively encrypting the result of each previous encryption step with the next of said selected sequence of predefined encryption steps.

11. An access control system as in claim 10, wherein said at least one portable password issuing device includes backup buffer means coupled to said generating means of said portable password issuing device for storing the results of at least one encryption step prior to the last encryption step performed by said generating means, backup key means for generating a backup signal, and backup means coupled to said generating means of said portable password issuing device for responding to said backup signal generated by transmitting an entry in said backup buffer means to said generating means for use in the next encryption step by said generating means.

12. An access control system as in claim 9, wherein said at least one portable password issuing device includes means for selecting one of said passwords stored in said device for use by said means for generating a new authentic password; said means for generating including means for replacing said selected password in said storage means with said new authentic password generated by said generating means.

13. An access control system as in claim 12, wherein said means for conveying includes means for prompting said user to select one of said passwords stored in said portable password issuing device.

14. A method of controlling access to at least one protected system, each protected system including means for reading a password submitted as part of a request for access to at least a specified portion of said protected system, and means for conveying information to said user; the steps of the method comprising:
storing at least one authentic password in a protected system,
defining a multiplicity of distince encryption steps using distinct ciphers,
selecting any sequency of one or more encryption steps from said multiplicity of defined encryption steps,
generating a new authentic password by encrypting a stored password with the first of said selected sequence of predefined encryption steps and, when said sequence contains more than one encryption step, successively encrypting the result of each previous encryption step with the next of said selected sequence of predefined encryption steps,
conveying, via said information conveying means, indicia of said selected sequence of defined encryption steps, thereby challenging said user to submit a password generating using said selected sequence of encryption steps;
comparing said new authentic password with said submitted password, and
permitting access to said portion of said protected system when a submitted password matches said new authentic password; and
providing at least one portable password issuing device for issuing authentic passwords to the possessor thereof, including means for performing any selected sequence of said predefined encryption steps.

15. An access control method as in claim 14, wherein said at least one portable password issuing device includes
means for selecting a sequence of one or more encryption steps from asid multiplicity of distinct predefined encryption steps, and
means for generating a new authentic password by encrypting a stored password with the first of said selected sequence of predefined encryption steps and, when said sequence contains more than one encryption step, successively encrypting the result of each previous encryption step with the next of said selected sequence of predefined encryption steps.

16. An access control method as in claim 15, further including the step of securely receiving a personal identification number specified by said user, including the steps of:
after permitting access to said portion of said protected system when a submitted password matches said new authentic password, requesting the submission of a personal identification number by requesting the user to submit a password corresponding to each digit of the personal identification number;
responding to each password submitted via said reading means by separately encrypting said authentic password with each of said defined encryption steps until a password is generated that matches said submitted password, storing as part of said user's personal identification number a numeric value corresponding to the encryption step which generates said matching password, and replacing said authentic password with said matching password.

17. An access control method as in claim 16, wherein said step of selecting a sequence of one or more encryption steps includes the step of generating a challenge value comprising at least one digit, and selecting a sequence of encryption steps corresponding to a predefined combination of said challenge value and said stored personal identification number.

18. An access control method as in claim 16, wherein said conveying step includes prompting said user to use said user's personal identification number when generating a password.

19. An access control method as in claim 14, wherein said step of selecting a sequence of one or more encryption steps includes the steps of generating a challenge value comprising at least one digit, and selecting a sequence of encryption steps corresponding to a predefined combination of said challenge value and a stored personal identification number.

20. An access control method as in claim 19, wherein said conveying step includes prompting said user to use the user's personal identification number when generating a password.

21. An access control method as in claim 19, wherein said step of generating a challenge value includes the step of generating a random number having at least one randomly generated digit.

22. An access control system, comprising:
at least one protected system, each protected system including means for reading a password submitted by a user as part of a request for access to at least a specified portion of said protected system, means for conveying information to said user, and digital computer means coupled to said reading means and said information conveying means for determining whether to permit access to said protected system; said digital computer means including:
means for selecting any sequence of one or more encryption steps from a multiplicity of distinct predefined encryption steps;
means for generating a new authentic password by encrypting a defined value with the first of said selected sequence of predefined encryption steps and, when said sequence contains more than one encryption step, successively encrypting the result of each previous encryption step with the next of said selected sequence of predefined encryption steps;
means for challenging said user, via said information conveying means, to encrypt a previously defined value using said selected sequence of encryption steps and to submit a password which is the result of said sequence of encryption steps;
means for comparing said new authentic password with said submitted password, and for permitting access to said portion of said protected system when a submitted password matches said new authentic password; and
said access control system further including at least one portable password issuing device for issuing authentic passwords to the possessor thereof, including means for performing any selected sequence of aid predefined encryption steps.

23. The access control system of claim 22, wherein said selecting means randomly selects said sequence of encryption steps.

24. A method of controlling access to at least one protected system, each protected system including means for reading a password submitted as part of a request for access to at least a specified portion of said protected system, and means for conveying information to said user; the steps of the method comprising:
defining a multiplicity of distinct encryption steps using distinct ciphers,
selecting any sequence of one or more encryption steps from said multiplicity of defined encryption steps,
generating a new authentic password by encrypting a defined value with the first of said selected sequence of predefined encryption steps and, when said sequence contains more than one encryption step, successively encrypting the result of each previous encryption step with the next of said selected sequence of predefined encryption steps,
conveying, via said information conveying means, indicia of said selected sequence of defined encryption steps, thereby challenging said user to submit a password generating using said selected sequence of encryption steps;
comparing said new authentic password with said submitted password, and
permitting access to said portion of said protected system when a submitted password matches said new authentic password; and
providing at least one portable password issuing device for issuing authentic passwords to the possessor thereof, including means for performing any selected sequence of asid predefined encryption steps.

25. An access control method as in claim 24, said selecting step randomly selecting said sequence of encryption steps.

* * * * *